March 13, 1945.  J. E. BRUMLEY  2,371,279
STEAM PAN
Filed March 17, 1944  2 Sheets-Sheet 1

Inventor
Jessie Elmer Brumley

By Clarence A. O'Brien
and Harvey B. Jacobson
Attorneys

March 13, 1945.  J. E. BRUMLEY  2,371,279
STEAM PAN
Filed March 17, 1944  2 Sheets-Sheet 2

Inventor
Jessie Elmer Brumley

By Clarence A. O'Brien
and Harvey B. Jacobson
Attorneys

Patented Mar. 13, 1945

2,371,279

UNITED STATES PATENT OFFICE 2,371,279

STEAM PAN

Jessie Elmer Brumley, Owensboro, Ky.

Application March 17, 1944, Serial No. 526,972

2 Claims. (Cl. 126—271.1)

My invention relates to improvements in steam pans, so called, such as are used in thawing out frozen ground and vegetation, eradicating certain kinds of weeds, and for similar purposes.

The invention is designed with the primary object in view of equipping such pans with inexpensive, simply constructed means for transporting the same over the ground to different locations or sets of plants, and elevating or lowering the pan as occasion may require.

Other and subordinate objects are also comprehended by my invention, all of which, together with the precise nature of my improvements, will be readily understood when the succeeding description and claims are read with reference to the drawings accompanying and forming part of this specification.

Figure 1:
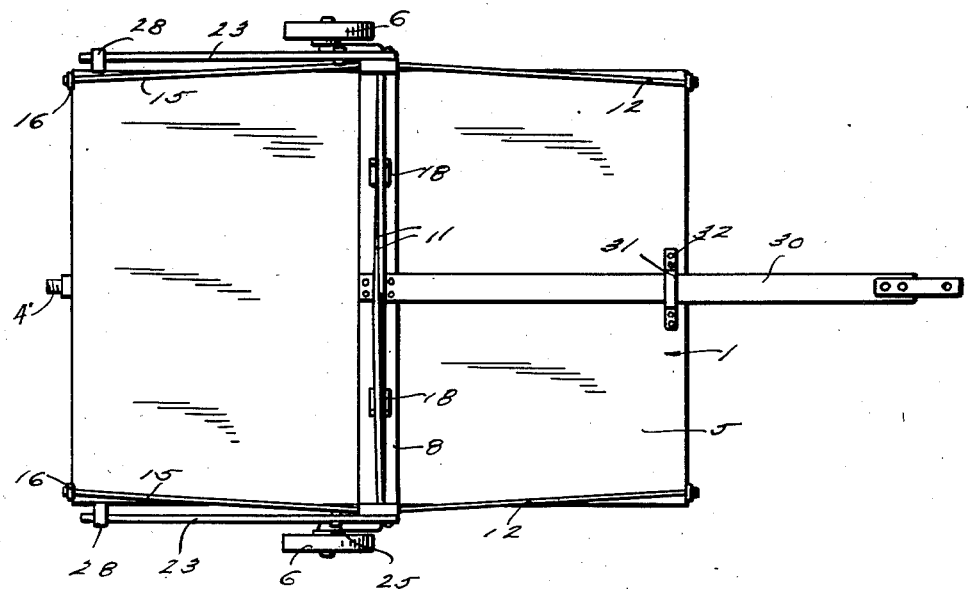
Figure 1 is a view in plan of my invention in its preferred embodiment.
Figure 2:
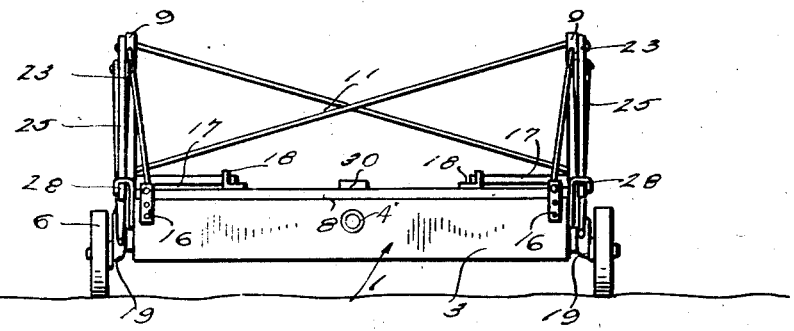
Figure 2 is a view in rear end elevation.
Figure 6:
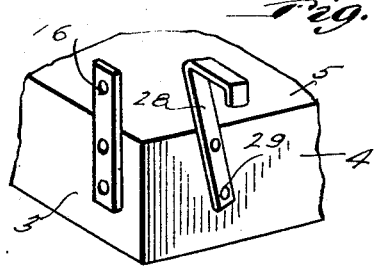
Figure 6 is a fragmentary view in perspective of one rear corner of the pan and parts carried thereby.

Referring to the drawings by numerals, according to my invention, the usual elongated, rectangular steam pan 1 with vertically straight front and rear ends 2, 3, similar sides 4, a flat top 5, and a steam inlet nipple 4' is equipped with a pair of ground wheels 6 and a wheel carriage 7.

The wheel carriage 7 is of yoke-like form and comprises a flat bar 8 coextensive in length with the width of the pan 1 and extending across the top 5 of said pan 1 in the transverse center of said pan, and a pair of bar-like uprights 9 rising from the sides 4 of said pan, respectively, well above the top 5 with lower ends 10 fitted flat against said sides 4 and the ends of the bar 8 suitably secured thereto, as by welding, not shown. The top 5 of the pan 1 and the sides 4 thereof may be secured to the bar 8 and the lower ends 10 of the uprights 9 in any desired manner. A pair of crossed diagonal strut rods 11 suitably connected at their ends to the uprights 9 above the pan 1 brace said uprights and incidentally the sides 4 of the pan 1 against lateral flexing. A pair of front strut rods 12 extend downwardly and forwardly from the upper ends of the uprights 9 to upright anchor bars 13 bolted, as at 14, to the front end 2 of the pan 1 adjacent the sides of said pan, said rods 12 bracing the pan 1 forwardly of the uprights 9 against sagging. A pair of rear strut rods 15 and anchor bars 16 similar to rods 12 and bars 13 similarly brace the pan 1 against sagging in the rear of the uprights 9.

The ground wheels 6 are mounted on a pair of crank-type axles having relatively long ends 17 journaled in the uprights 9 in overlying relation to the pan 1 and also in a pair of bearing brackets 18 suitably fixed on said bar 8, the crank ends 19 of the axles trailing the uprights 9 so that the pan 1 is over-balanced forwardly of the ground wheels 6. Pins 20 in said ends 17 at the inner sides of the uprights 9 and washers 21 on said ends between the crank ends 19 and said uprights prevent endwise play of said axles. Suitable washers 22 on the crank ends 19 back the ground wheels 6 which may be secured on said crank ends in any conventional manner.

Figure 3:
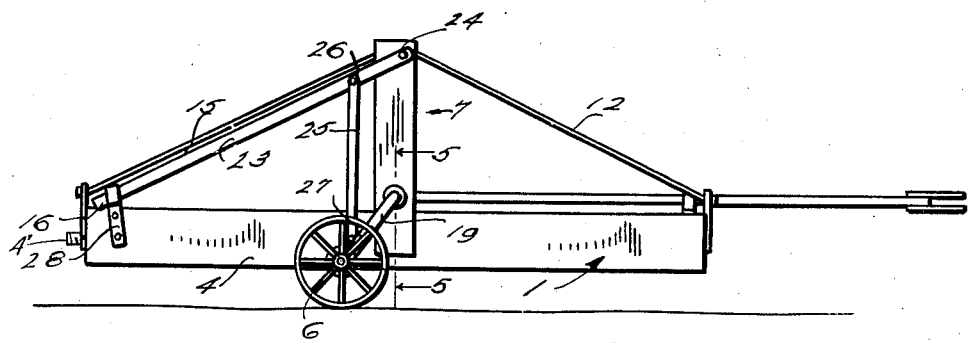
Figure 3 is a view in side elevation and showing the position of the parts when the pan is elevated.
Figure 4:
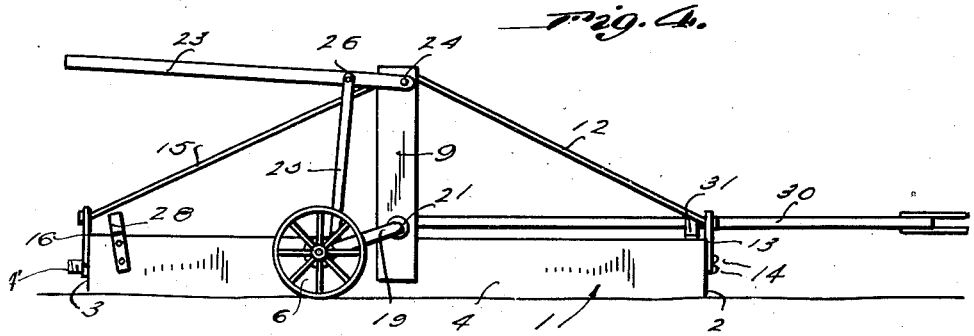
Figure 4 is a similar view with the pan lowered.
Figure 5:
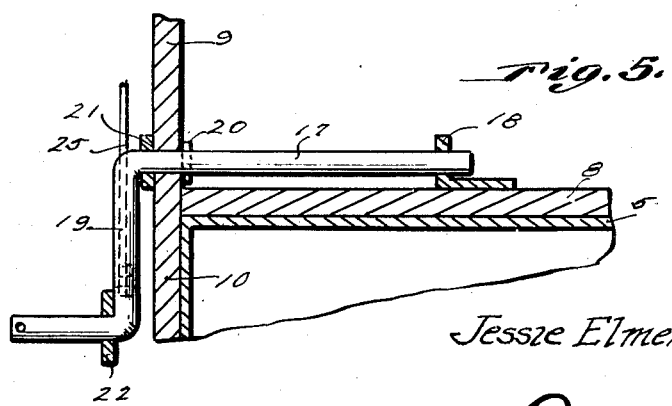
Figure 5 is a fragmentary view in transverse section taken on the line 5—5 of Figure 3 and drawn to an enlarged scale.

A pair of hand levers 23 are pivoted, as at 24, to the uprights 9 adjacent the upper ends of said uprights to extend rearwardly therefrom and for vertical swinging movement. A pair of operating bars 25 are pivoted at upper ends thereof, as at 26, to said levers 23 in the rear of the pivots 24 with lower ends pivoted, as at 27, to the crank ends 19 of said axles, as best shown in Figures 3 and 5. The levers 23 and bars 25 are so arranged that by swinging said levers downwardly, the carriage 7 and pan 1 may be elevated about the axis of the ground wheels 6 to lift the pan 1 off the ground. Conversely, by permitting the levers 23 to swing upwardly into substantially horizontal position, the carriage 7 and pan 1 may be lowered about the axis of said ground wheels to seat said pan on the ground. A pair of hook-shaped keepers 28 are provided on the sides 4 of the pan 1 adjacent the rear corners of said pan and beneath which the levers 23 may be swung to lock said levers in downwardly swung position and the pan 1 elevated. The keepers 28 are bolted, as at 29, to the sides 4 of said pan.

A suitable draft tongue 30 extends forwardly from the bar 8 in the longitudinal center of the pan 1 and through a holding bracket 31 bolted to the top 5, as at 32.

The described invention is designed to be connected, by the tongue 30, to any suitable draft vehicle, not shown, and it is comprehended by my invention that suitable provision may be made for introducing steam from the draft vehicle into the pan 1 at will.

The foregoing will, it is believed, suffice to impart a clear understanding of my invention, since the operation thereof has been explained in connection with the description of parts.

Manifestly, the invention, as described, is susceptible of modification without departing from the inventive concept, and right is herein reserved to such modifications as fall within the scope of the appended claims.

What I claim is:

1. In apparatus of the class described, a pan of rectangular form having a closed top, and adapted for receiving steam, a pair of ground wheels at opposite sides of said pan, means to elevate and lower the pan about the axis of said wheels, and a draft tongue for the pan, said means comprising a pair of crank-type axles for said wheels, a pair of uprights rising from opposite sides of said pan and in which said axles are journaled in overlying relation to said pan, a pair of vertically swingable levers pivoted to said uprights at the upper ends thereof, and a pair of bars pivotally connected to said levers and to the cranks of said axles.

2. In apparatus of the class described, a pan of rectangular form having a closed top, and adapted for receiving steam, a pair of ground wheels at opposite sides of said pan, means to elevate and lower the pan about the axis of said wheels, and a draft tongue for the pan, said means comprising a pair of crank-type axles for said wheels, a pair of uprights rising from opposite sides of said pan and in which said axles are journaled in overlying relation to said pan, a pair of vertically swingable levers pivoted to said uprights at the top thereof, a pair of bars pivotally connected to said levers and to the crank of said axles, and a pair of keepers on said pan with which said levers may be engaged by lateral flexing of the levers, said keepers preventing upward swinging of the levers.

JESSIE ELMER BRUMLEY.